(12) United States Patent
Kim et al.

(10) Patent No.: US 9,609,221 B2
(45) Date of Patent: Mar. 28, 2017

(54) IMAGE STABILIZATION METHOD AND ELECTRONIC DEVICE THEREFOR

(71) Applicant: Samsung Electronics Co., Ltd., Suwon-si, Gyeonggi-do (KR)

(72) Inventors: Pyo-Jae Kim, Hwaseong-si (KR); Ki-Huk Lee, Yongin-si (KR); Young-Kwon Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 14/304,294

(22) Filed: Jun. 13, 2014

(65) Prior Publication Data

US 2015/0062410 A1   Mar. 5, 2015

(30) Foreign Application Priority Data

Sep. 2, 2013  (KR) .......................... 10-2013-0104861

(51) Int. Cl.
*H04N 5/232* (2006.01)
*H04N 5/235* (2006.01)

(52) U.S. Cl.
CPC ....... *H04N 5/23277* (2013.01); *H04N 5/2353* (2013.01); *H04N 5/2354* (2013.01); *H04N 5/23254* (2013.01)

(58) Field of Classification Search
CPC .... H04N 5/235; H04N 5/2353; H04N 5/2354; H04N 5/23254; H04N 5/23277
USPC ...... 348/169, 221.1, 229.1, 230.1, 235, 296, 348/297, 362, 363, 364, 366, 367
See application file for complete search history.

(56) References Cited

U.S. PATENT DOCUMENTS

| | | | | |
|---|---|---|---|---|
| 6,778,210 B1 * | 8/2004 | Sugahara | ........... | H04N 5/23248 348/208.4 |
| 6,856,356 B1 * | 2/2005 | Kahn | ..................... | G03B 15/00 348/370 |
| 7,664,382 B2 * | 2/2010 | Yamasaki | .............. | G03B 7/093 348/208.1 |
| 8,237,811 B2 * | 8/2012 | Minakuti | ............... | H04N 1/393 348/229.1 |
| 2006/0158523 A1 * | 7/2006 | Estevez | ............. | H04N 5/23248 348/208.4 |
| 2012/0194686 A1 * | 8/2012 | Lin | ...................... | H04N 5/2355 348/208.4 |

FOREIGN PATENT DOCUMENTS

JP         2006-157168 A       6/2006

* cited by examiner

*Primary Examiner* — Lin Ye
*Assistant Examiner* — Chriss Yoder, III
(74) *Attorney, Agent, or Firm* — Jefferson IP Law, LLP

(57) ABSTRACT

An apparatus and method for reducing or preventing image degradation due to shaking of a camera upon image acquisition is provided. The method includes determining illuminance corresponding to a subject, automatically determining a capturing mode of an electronic device based on at least the illuminance, acquiring a first resulting image of the subject based on a first exposure time, if the capturing mode is a first capturing mode, and acquiring a plurality of images of the subject based on a second exposure time, if the capturing mode is a second capturing mode, and generating a second resulting image based on at least two images among the plurality of images.

22 Claims, 14 Drawing Sheets

IMAGE STABILIZATION METHOD AND ELECTRONIC DEVICE THEREFOR

CROSS-REFERENCE TO RELATED APPLICATION(S)

This application claims the benefit under 35 U.S.C. §119 (a) of a Korean patent application filed on Sep. 2, 2013 in the Korean Intellectual Property Office and assigned Serial No. 10-2013-0104861, the entire disclosure of which is hereby incorporated by reference.

TECHNICAL FIELD

The present disclosure relates to image processing for image stabilization in electronic devices.

BACKGROUND

In capturing an image using a digital camera, shaking of the camera may occur due to a user's shake or an unintended motion, which results in a poorly focused image. A variety of methods have been studied for camera shake correction. In the related art, there are three methods for camera shake correction, that is, a digital camera shake correction method, an electronic camera shake correction method, and an optical camera shake correction method.

As for the digital camera shake correction method, both the detection of a camera shake amount and the correction of a camera shake are achieved by image processing. Thus, the digital camera shake correction method may not ensure low hardware costs and small dimensions. The optical camera shake correction method may correct a still image and provide an excellent image quality even after the correction. However, the optical camera shake correction method additionally requires a motion detector, such as a gyro sensor, for detecting a camera shake amount, and an optical corrector for correcting a camera shake detected by the motion detector. The electronic camera shake correction method is a combination of the digital camera shake correction method and the optical camera shake correction method.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an aspect of the present disclosure is to provide an apparatus and method for acquiring (for example, capturing) an image without camera shake at low illuminance in an electronic device.

Another aspect of the present disclosure is to provide an apparatus and method for preventing an image from being blurredly captured due to a subject's motion or camera shake by increasing an exposure time at low illuminance in an electronic device.

Another aspect of the present disclosure is to provide an apparatus and method for preventing occurrence of a brightness difference between a subject and a background by flashing light at low illuminance in an electronic device.

Another aspect of the present disclosure is to provide an apparatus and method for acquiring an image without camera shake by using image synthesis in an electronic device.

Another aspect of the present disclosure is to provide an apparatus and method for acquiring an image without camera shake at low illuminance by using image synthesis in an electronic device.

Another aspect of the present disclosure is to provide an apparatus and method for determining the number of images for image synthesis according to the degree of low illuminance in an electronic device.

Another aspect of the present disclosure is to provide an apparatus and method for enhancing brightness of all or part of an image to be synthesized according to the degree of low illuminance in an electronic device.

Another aspect of the present disclosure is to provide an apparatus and method for flashing light upon capturing of a part of images to be synthesized according to the degree of low illuminance in an electronic device.

In accordance with an aspect of the present disclosure, a method for an operation of an electronic device is provided. The method includes determining illuminance corresponding to a subject, automatically determining a capturing mode of an electronic device based on at least the illuminance, acquiring a first resulting image of the subject based on a first exposure time if the capturing mode is a first capturing mode, and acquiring a plurality of images of the subject based on a second exposure time, if the capturing mode is a second capturing mode, and generating a second resulting image based on at least two images among the plurality of images.

In accordance with another aspect of the present disclosure, an electronic device is provided. The electronic device includes an image sensor configured to acquire an image of a subject, and at least one processor. The least one processor may be configured to execute a process including determining illuminance corresponding to the subject, automatically determining a capturing mode based on at least the illuminance, acquiring a first resulting image of the subject based on a first exposure time, if the capturing mode is a first capturing mode, and acquiring a plurality of images of the subject based on a second exposure time, if the capturing mode is a second capturing mode, and generating a second resulting image of the subject based on at least two images among the plurality of images.

In accordance with another aspect of the present disclosure, a computer-readable recording medium is provided. The computer-readable recording medium includes storing instructions for executing a process including determining illuminance corresponding to a subject, automatically determining a capturing mode of an electronic device based on at least the illuminance, acquiring a first resulting image of the subject based on a first exposure time, if the capturing mode is a first capturing mode, and acquiring a plurality of images of the subject based on a second exposure time, if the capturing mode is a second capturing mode, and generating a second resulting image of the subject based on at least two images among the plurality of images.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure relate to a technology for acquiring an image without camera shake using image synthesis in an electronic device.

In various embodiments of present disclosure, the electronic device may be a portable electronic device, and may be one of a smartphone, a mobile terminal, a mobile phone, a mobile pad, a media player, a tablet computer, a handheld computer, a Personal Digital Assistant (PDA), and the like. In addition, the electronic device may be a device combined with two or more functions of the above-mentioned devices.

Figure 1:
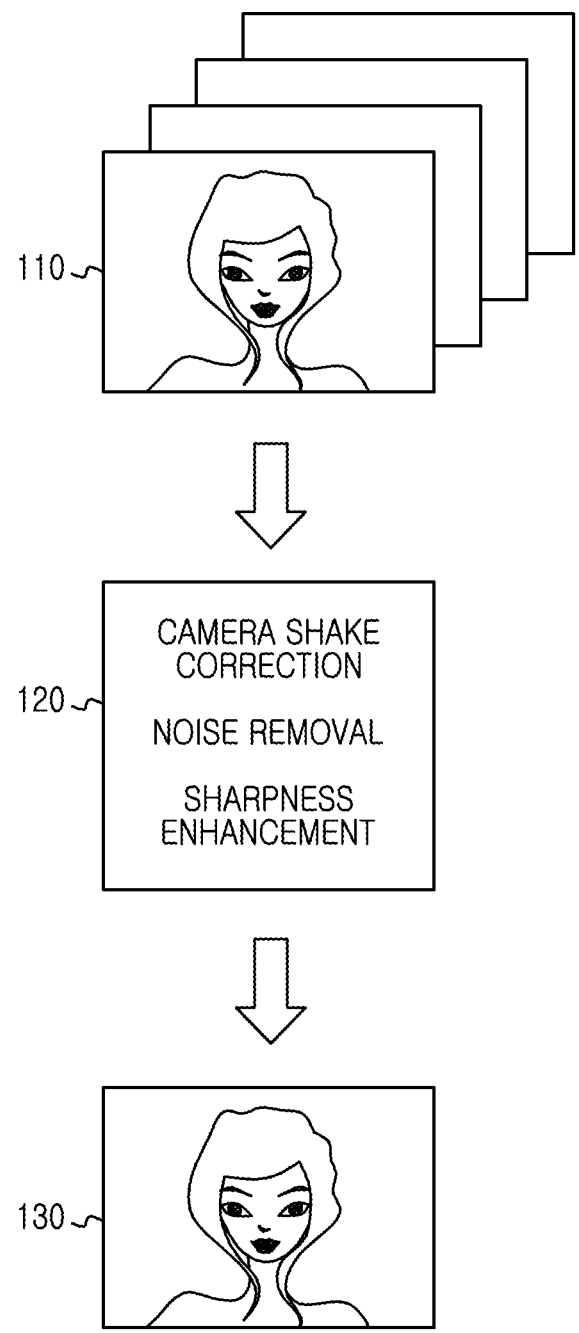
FIG. 1 is a diagram illustrating image processing for acquiring an image without camera shake in an electronic device according to an embodiment of the present disclosure.

FIG. 1 is a diagram illustrating image processing for acquiring an image without camera shake in an electronic device according to an embodiment of the present disclosure.

Referring to FIG. 1, the electronic device may acquire an image without camera shake or an image with reduced camera shake by using a plurality of original images 110. In the related art, an image may be corrected by flashing light for increasing illuminance, by reducing an exposure time while abandoning brightness, or by post-processing a captured image, so as to acquire an image without camera shake under a low illuminance environment. In a certain embodiment, a plurality of images 110 generated through repetitive capturing may be used.

The plurality of images 110 experience image processing 120, such as camera shake correction, noise removal, and sharpness enhancement. For example, the electronic device may obtain the effects of camera shake correction, noise removal, and sharpness enhancement by synthesizing the plurality of images 110. As a result, a corrected image 130 may be generated.

In the image processing 120, specific processing methods may be different according to a capturing environment, including at least one of a main subject (for example, person) and a sub subject (for example, background). Hereinafter, the different processing methods according to the illuminance will be described with reference to FIG. 2.

Figure 2:
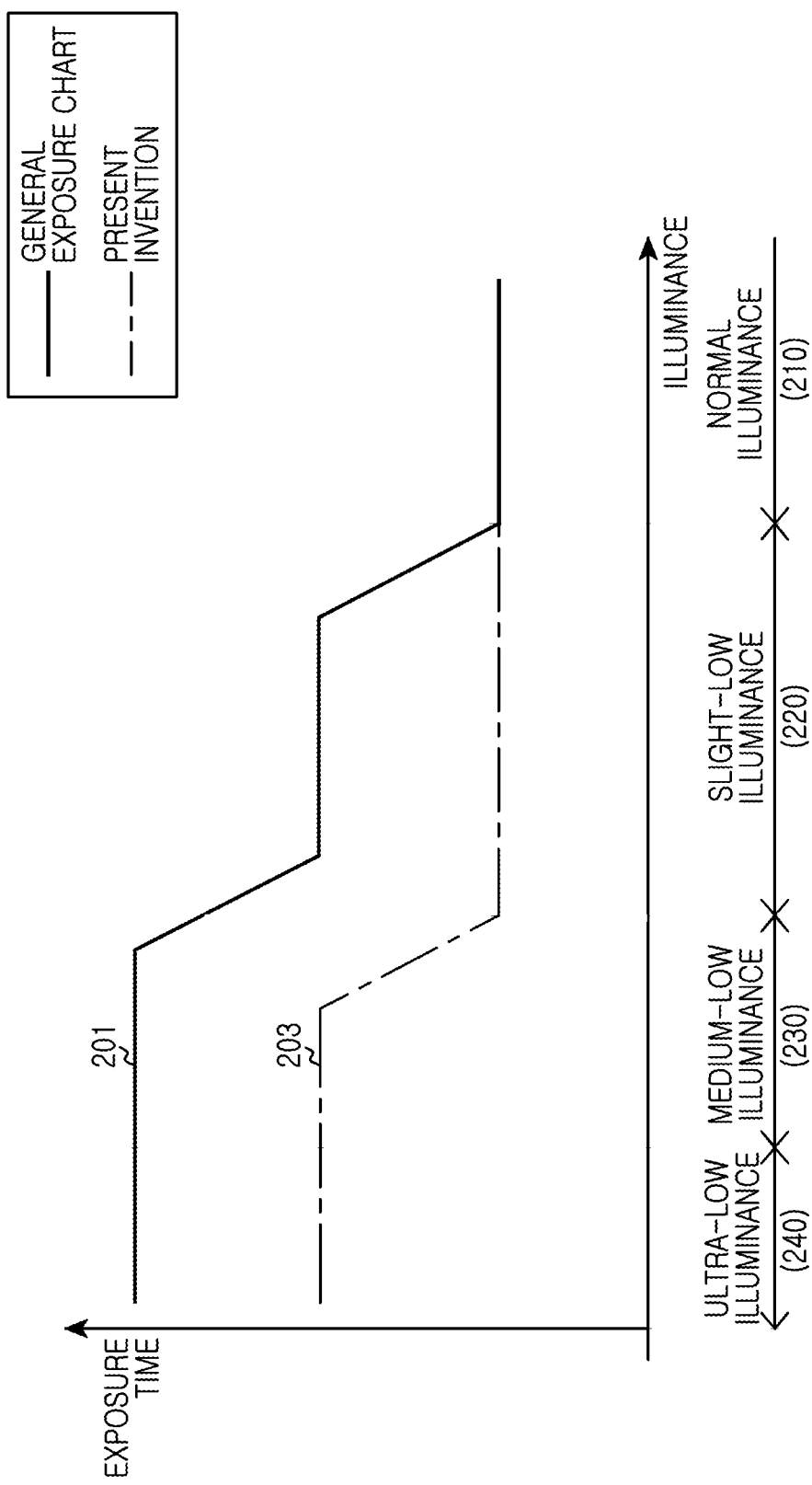
FIG. 2 is a diagram illustrating an exposure time at each illuminance in an electronic device according to an embodiment of the present disclosure.

FIG. 2 is a diagram illustrating an exposure time at each illuminance for image processing in an electronic device according to an embodiment of the present disclosure.

FIG. 2 is an exposure chart illustrating an exposure time at each illuminance necessary for acquiring an image having a predetermined brightness. Referring to FIG. 2, a horizontal axis represents illuminance, and a vertical axis represents an exposure time relative to a corresponding illuminance.

According to various embodiments, an exposure value may be determined based on an exposure time and a sensor gain. For example, according to an embodiment, the exposure value may be obtained by applying a mathematical function (for example, multiplication, addition, or logarithm) to the exposure time and the sensor gain. The sensor gain is a value (for example, ratio) indicating how sensitively the sensor responds to the same intensity of light. For example, as the sensor gain is increased, a pixel may be brighter even at the same intensity of light. Hereinafter, for convenience of explanation, the sensor gain may also be referred to as sensor sensitivity. According to an embodiment, the illuminance may correspond to the exposure value in a one-to-one manner. According to a certain embodiment, the illuminance may correspond to the exposure value in a one-to-many or many-to-many manner.

In FIG. 2, a solid line 201 is a general exposure chart and indicates an exposure time according to illuminance necessary for acquiring an image of predetermined brightness according to the related art, and a dashed-dotted line 203 represents an exposure time according to illuminance according to an embodiment of the present disclosure.

Referring to FIG. 2, the illuminance may be divided into at least four sections. In other words, the illuminance may be divided into normal illuminance 210, slight-low illuminance 220, medium-low illuminance 230, and ultra-low illuminance 240. The normal illuminance 210 may refer to illuminance capable of acquiring an image of a predetermined brightness without image synthesis. The slight-low illuminance 220, the medium-low illuminance 230, and the ultra-low illuminance 240 are sections that have lower brightness than the normal illuminance 210, and the environment becomes darker in the order of the slight-low illuminance 220, the medium-low illuminance 230, and the ultra-low illuminance 240.

According to embodiments of the present disclosure, the electronic device may measure the illuminance of the image. For example, the electronic device may measure the illuminance by using an image input for preview. Then, the electronic device may process the image in a different method according to a section to which the measured illuminance belongs.

In the case of the normal illuminance 210, the electronic device may capture an image for an exposure time based on the exposure chart 203, without flashing light, brightness enhancement, or image synthesis.

The slight-low illuminance 220 refers to an environment that has lower brightness than the normal illuminance 210. The slight-low illuminance 220 refers to a section in which the exposure time may be increased for capturing an image of predetermined brightness when complying with the general exposure chart 201. As illustrated in the exposure chart 203, in the case of the slight-low illuminance 220, the electronic device may capture an image for an exposure time shorter than that in the general exposure chart 201. For example, the electronic device may capture an image for the same exposure time as that in the normal illuminance 210, or may capture an image for an exposure time longer than that in the normal illuminance 210 but shorter than that in the general exposure chart 201. The greatest reason for the occurrence of camera shake in capturing an image is the increase of the exposure time. Therefore, the electronic device may address the camera shake by suppressing the increase of the exposure time, in spite of the environment of the slight-low illuminance 220 in which the exposure time needs to be increased according to the general exposure chart 201. However, in order to ensure the predetermined brightness of the image, the electronic device may increase the sensor gain such that the image is captured with the same brightness as in the normal illuminance 210. However, the increase of the sensor gain may increase noise in the captured image. Therefore, in order to reduce the noise, the electronic device may capture a plurality of images and synthesize the captured images. As the illuminance is lowered in the section of the slight-low illuminance 220, the number of times of image capturing may be increased.

The medium-low illuminance 230 is a section that has lower brightness than the slight-low illuminance 220. In the case of the medium-low illuminance 230, the electronic device may capture an image for an exposure time longer than that in the slight-low illuminance 220. However, the exposure time in the medium-low illuminance 230 is shorter than the exposure time according to the general exposure chart 201. Similar to the case of the slight-low illuminance 220, the electronic device may capture a plurality of images and synthesize the captured images. The number of times of image capturing may be increased as the illuminance is lowered in the medium-low illuminance 230. In this case, the minimum number of times of image capturing in the section of the medium-low illuminance 230 may be equal to the maximum number of times of image capturing in the section of the slight-low illuminance 220. In addition, the electronic device may perform brightness correction to enhance the brightness of the synthesized image.

The ultra-low illuminance 240 is a section that has lower brightness than the medium-low illuminance 230, and is a section in which it is determined that noise more than a threshold value occurs upon the brightness correction in the medium-low illuminance 230. In the case of the ultra-low illuminance 240, the electronic device may capture an image for the same exposure time as that in the section of the medium-low illuminance 230. However, the exposure time in the ultra-low illuminance 240 is shorter than the exposure time according to the general exposure chart 201. Similar to the case of the slight-low illuminance 220, the electronic device may capture a plurality of images and synthesize the captured images. The number of times of image capturing may be increased as the illuminance is lowered in the section of the ultra-low illuminance 240. In this case, the minimum number of times of image capturing in the section of the ultra-low illuminance 240 may be equal to the maximum number of times of image capturing in the section of the slight-low illuminance 220. In this case, unlike the case of the slight-low illuminance 220 and the medium-low illuminance 230, the electronic device may flash light when capturing a part of the images. When the light is flashed, it is usual that a brightness difference occurs between the subject and the background. Therefore, upon the synthesis of the images captured with the light flashing, the electronic device may separate the subject and the background and synthesize the subject and the background with different weight values.

Hereinafter, image processing methods for each illuminance section according to various embodiments of the present disclosure will be described with reference to the accompanying drawings.

Figure 3:
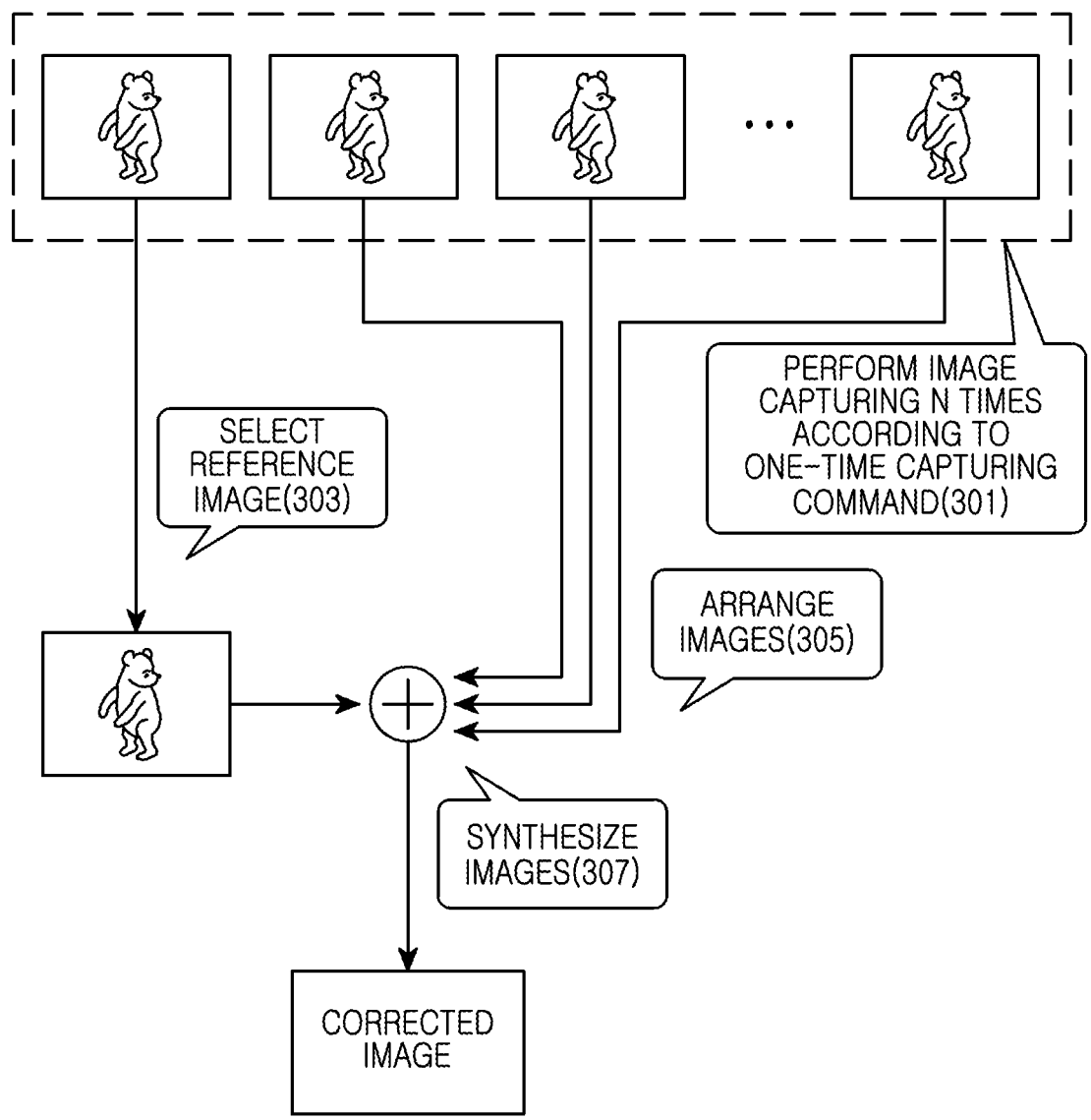
FIG. 3 is a diagram illustrating image processing under a slight-low illuminance environment in an electronic device according to an embodiment of the present disclosure.

FIG. 3 illustrates image processing under the slight-low illuminance environment in an electronic device according to an embodiment of the present disclosure.

Referring to FIG. 3, in operation 301, image capturing may be performed N times according to a one-time capturing command. A specific number N of times of image capturing may be different according to the illuminance. For example, the number N of times of image capturing may be increased as the illuminance is lowered. Upon the image capturing, the exposure time equal to that in the normal illuminance may be applied, and the sensor sensitivity may be set to be higher than that in the normal illuminance. Therefore, the brightness of each image may be equal to the brightness based on the exposure chart of the image captured at the normal illuminance.

In operation 303, a reference image may be selected from the captured images. The reference image serves as the reference of synthesis, and the least blurred image may be selected as the reference image. For example, the electronic device may detect a boundary of each image and select an image having the most distinct boundary contrast as the reference image.

In operation 305, images other than the reference image may be arranged with reference to the reference image. The arrangement refers to matching pixel positions of the same subject among the images, considering a global motion of each image. The global motion may be generated by the motion of the capturing device, that is, the electronic device, during the image capturing. That is, the electronic device may compensate for the global motion by shifting the images vertically or horizontally or titling the images. For the purpose of arrangement, the electronic device may detect a common feature point in each image.

In operation 307, the reference image and the arranged images may be synthesized. That is, the pixel values of the reference image may be corrected using the pixel values of the images. For example, the electronic device may equalize the pixel values for the same positions of the same subject. In this manner, the electronic device may enhance the boundary of the reference image and reduce noise. At this time, when the local motion is present in the images, the synthesis of the parts where the local motion is present may be performed differently from the other parts. The synthesis procedure in the case where the local motion is present will be described below with reference to FIG. 4. Through operation 307, the synthesized image, that is, the corrected image, may be generated.

Figure 4:
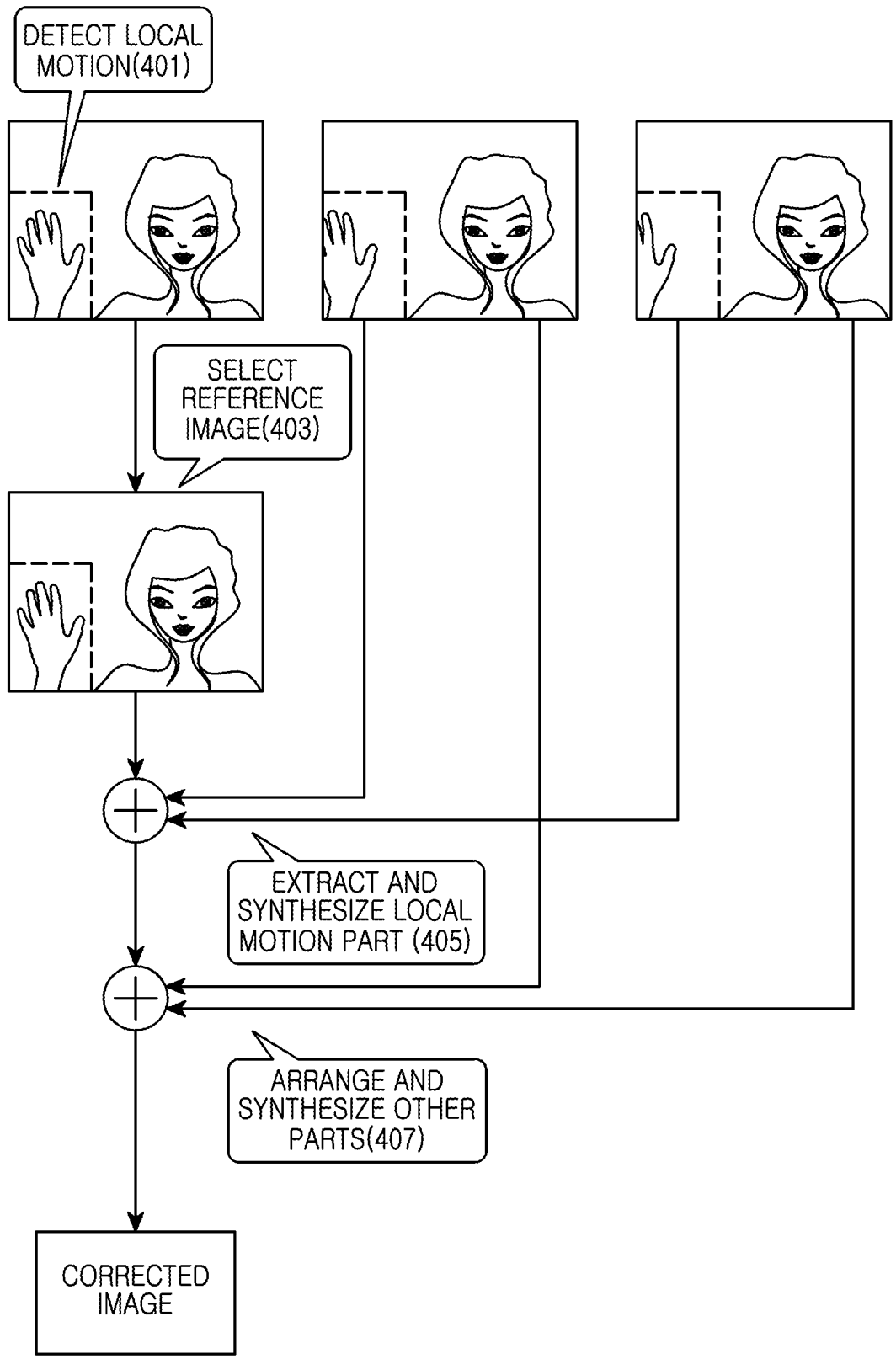
FIG. 4 is a diagram illustrating image processing in a case where a local motion is present in an electronic device according to an embodiment of the present disclosure.

FIG. 4 is a diagram illustrating image processing in a case where a local motion is present in an electronic device according to an embodiment of the present disclosure.

FIG. 4 illustrates a procedure of synthesizing three images in which the local motion is present. However, the embodiment illustrated in FIG. 4 may also be applied in a similar manner even in the case of synthesizing two images or four or more images.

Referring to FIG. 4, in operation 401, the local motion may be detected. The local motion may be determined based on the extraction of feature points of the images and the analysis of motion vectors of pixels between the images. For example, the electronic device may determine the presence of the local motion according to whether the extracted feature points are detected within a predetermined pixel range in each image. That is, when the pixels within a pixel set constituting constant patterns have motion vectors with the same direction and magnitude, the electronic device may determine that all or part of the subject moves within the image. In the case of FIG. 4, the subject is a person and the local motion is present in the person's hand.

In operation 403, a reference image may be selected from the captured images. The reference image serves as the reference of synthesis, and the least blurred image may be selected as the reference image. For example, the electronic device may detect a boundary of each image and select an image having the most distinct boundary contrast as the reference image.

In operation 405, the local motion part may be extracted and synthesized. Since the local motion part has a different relative position change with respect to other objects, the pixel positions are not collectively matched through the arrangement described in the embodiment illustrated in FIG. 3. Therefore, the local motion part may be synthesized separately from the other parts. That is, the electronic device may search pixels of other images corresponding to the reference image in the local motion part, based on the extracted feature points, and correct the pixel values of the reference image by using the searched pixels. For example, the electronic device may equalize the pixel values for the same positions of the same subject. In this manner, the electronic device may enhance the boundary of the reference image and reduce noise.

In operation 407, parts other than the local motion part may be arranged and synthesized. In other words, the electronic device may compensate for the global motion by shifting the other images vertically or horizontally or titling the images, and correct the respective pixel values of the reference image in the other parts by using the pixel values of the images. For example, the electronic device may equalize the pixel values for the same positions of the same subject. In this manner, the electronic device may enhance the boundary of the reference image and reduce noise.

In the embodiment illustrated in FIG. 4, the local motion part may be synthesized in operation 405, and the other parts may be synthesized in operation 407. However, according to another embodiment of the present disclosure, the other parts may be synthesized prior to the local motion part. In addition, unlike the embodiment illustrated in FIG. 4, a plurality of local motion parts may be present.

Figure 5:
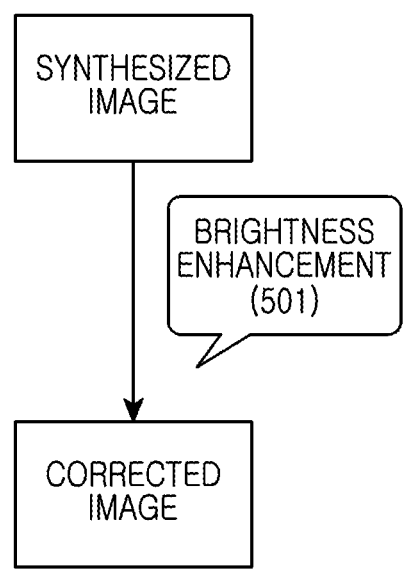
FIG. 5 is a diagram illustrating image processing under a medium-low illuminance environment in an electronic device according to an embodiment of the present disclosure.

FIG. 5 is a diagram illustrating image processing under the middle-low illuminance environment in an electronic device according to an embodiment of the present disclosure.

Referring to FIG. 5, in operation 501, the correction for brightness enhancement may be performed on the synthesized image. The synthesized image is the corrected image generated by an embodiment illustrated in FIG. 3 or FIG. 4. However, in the embodiment of FIG. 5, a relatively long exposure time may be applied upon the image capturing, as opposed to the embodiment of FIG. 3. In addition, in the embodiment of FIG. 5, the electronic device may synthesize the images after the same number of times of image capturing as that in the embodiment of FIG. 3 or after a larger number of times of image capturing than that in the embodiment of FIG. 3.

The brightness enhancement may be performed by assigning a weight value of more than 1 to the pixel values of the synthesized image. In this case, the same weight value may not be collectively assigned to all the pixels. For example, in a case where brightness around a specific pixel is higher than a threshold value, the electronic device may determine that the specific pixel needs to be brighter, and assign a relatively larger weight value to the specific pixel. In addition, in a case where it is determined that the specific pixel is already sufficiently bright, the electronic device may maintain the brightness of the specific pixel as it is. Therefore, the brightness-enhanced corrected image may be generated.

The brightness enhancement has been described above on the assumption that the brightness is higher as the pixel value is larger. However, the relationship between the pixel value and the brightness may be different according to the representation form of the pixel value. For example, as the pixel value is smaller, the brightness may be lowered. In this case, the correlation between the weight value and the brightness enhancement should be differently understood at the level of those skilled in the art.

In the embodiment illustrated in FIG. 5, the brightness correction may be performed after the image synthesis. However, according to another embodiment of the present disclosure, the brightness correction may be included in the image synthesis procedure. That is, the electronic device may perform the brightness correction as a part of the image synthesis procedure by adjusting the weight values of the pixel values to be synthesized in the image synthesis procedure.

Figure 6:
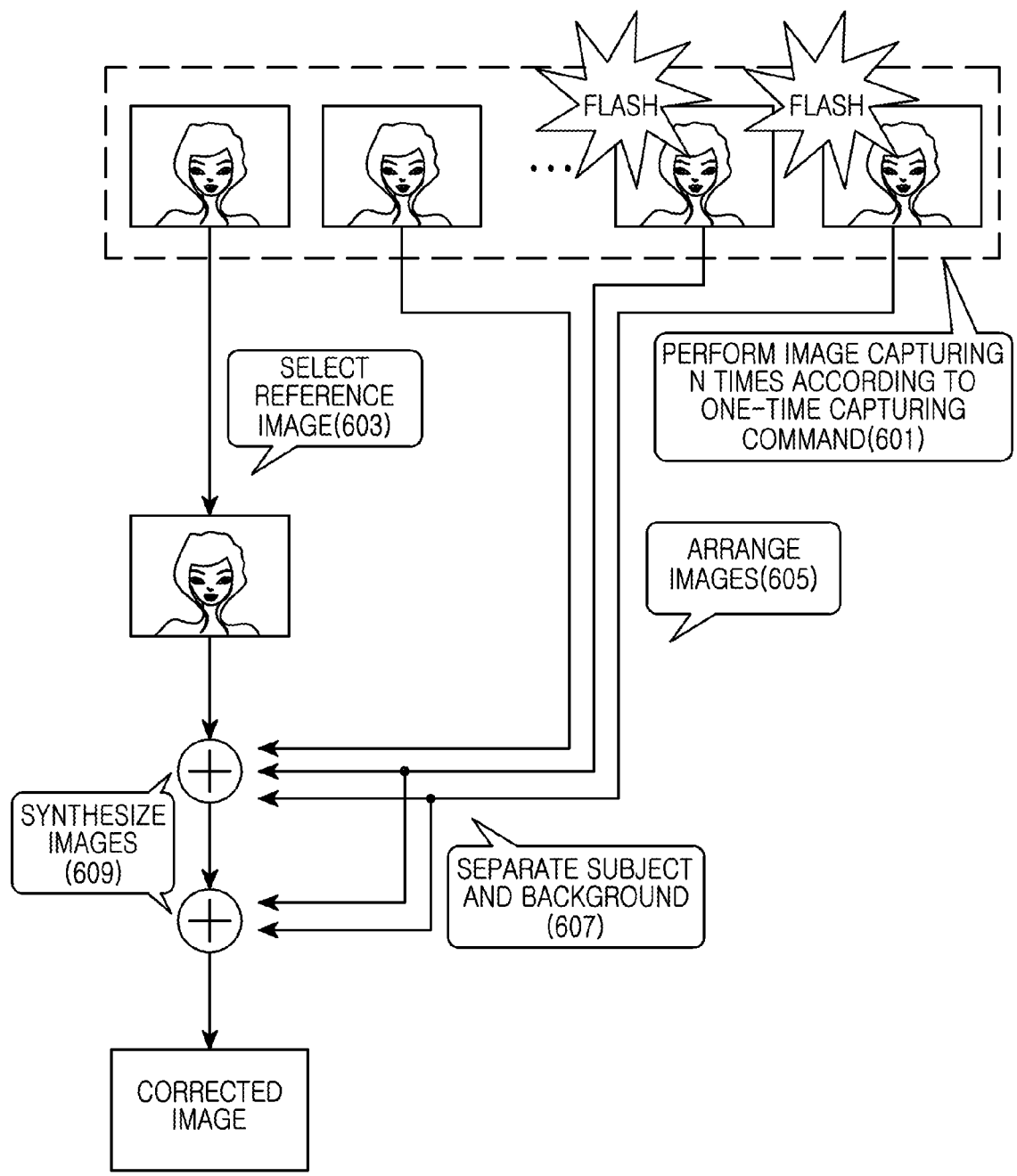
FIG. 6 is a diagram illustrating image processing under an ultra-low illuminance environment in an electronic device according to an embodiment of the present disclosure.

FIG. 6 is a diagram illustrating image processing under an ultra-low illuminance environment in an electronic device according to an embodiment of the present disclosure.

Referring to FIG. 6, in operation 601, image capturing may be performed N times according to a one-time capturing command. In some cases, light is flashed upon image capturing. A specific number of times of image capturing with the light flashing may be different according to the illuminance. For example, the number N of times of image capturing with the light flashing may be increased as the illuminance is lowered. In addition, the number N of times of image capturing may be different according to the illuminance. Upon the image capturing, a relatively long exposure time may be applied as compared with the normal illuminance.

In operation 603, a reference image may be selected from the captured images. The reference image serves as the reference of synthesis, and the least blurred image may be selected as the reference image. For example, the electronic device may detect a boundary of each image and select an image having the most distinct boundary contrast as the reference image.

In operation 605, images other than the reference image may be arranged with reference to the reference image. The arrangement refers to matching pixel positions of the same subject between the images, considering a global motion of each image. The global motion may be generated by the motion of the capturing device, that is, the electronic device, during the image capturing. That is, the electronic device may compensate for the global motion by shifting the images vertically or horizontally or titling the images. For the purpose of arrangement, the electronic device may detect a common feature point in each image.

In operation 607, the subject and the background may be separated in the images captured with the light flashing. In a case where the image is captured with the light flashing, a difference occurs in an arrival time of the flashed light according to a distance difference between the objects to be captured, and thus, it is usual that brightness difference occurs between the relatively close subject and the relatively distant background. Therefore, when images are synthesized without distinction between the subject and the background, the brightness difference is reflected as it is. As a result, an unnatural image may be generated. Therefore, the brightness difference may be overcome by separating the subject and the background from each other. The subject and the background may be separated by comparison between an image captured with the light flashing and an image captured without light flashing. For example, the brightness difference in the subject is greater than the brightness difference in the background, among the images captured with the light flashing and the images captured without light flashing. Therefore, when the brightness difference of the two different regions between both images is observed by more than a threshold value, the electronic device may determine that the part showing the brightness difference more than the threshold value is the subject.

In operation 609, the reference image and the arranged images may be synthesized. That is, the pixel values of the reference image may be corrected using the pixel values of the images. For example, the electronic device may equalize the pixel values for the same positions of the same subject. In this manner, the electronic device may enhance the boundary of the reference image and reduce noise. At this time, in order to compensate for the brightness difference between the subject and the background due to the light flashing, different weight values may be assigned to the subject part and the background part. For example, since the subject part is relatively brighter in the image captured with the light flashing, the weight value for the subject part may be less than the weight value for the background part. At this time, when the local motion is present in the images, the synthesis of the parts where the local motion is present may be performed differently from the other parts. The synthesis in the case where the local motion is present may be performed as illustrated in FIG. 4.

Figure 7:
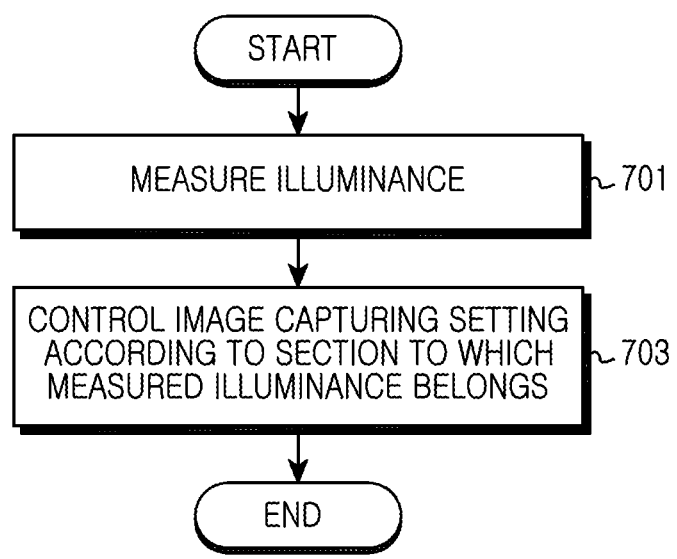
FIG. 7 is a diagram illustrating an operation procedure of an electronic device according to an embodiment of the present disclosure.

FIG. 7 is a diagram illustrating an operation procedure of an electronic device according to an embodiment of the present disclosure.

Referring to FIG. 7, in operation 701, the electronic device may measure the illuminance. The illuminance refers to the illuminance of the image to be captured. For example, the electronic device may measure the illuminance by using the image input for preview. The illuminance may be indicated by an exposure value.

After measuring the illuminance, the electronic device may proceed to operation 703 to control an image capturing setting according to the section to which the measured illuminance belongs. The image capturing setting may include at least one of the number of times of image capturing, exposure time, sensor sensitivity, light flashing or not, the number of times of image capturing with the light flashing, and brightness correction or not. That is, as illustrated in FIG. 2, the electronic device may store information on the exposure chart and the illuminance section, according to an embodiment of the present disclosure, and may differentiate the image capturing and processing according to the measured illuminance. For example, the information on the exposure chart and the illuminance section may include threshold values distinguishing the illuminance sections, the exposure time at each illuminance section, and the sensor sensitivity values.

The method described above in relation with FIG. 7 under of the present invention may be provided as one or more instructions in one or more software modules, or computer programs stored in an electronic device including a portable terminal.

Figure 8:
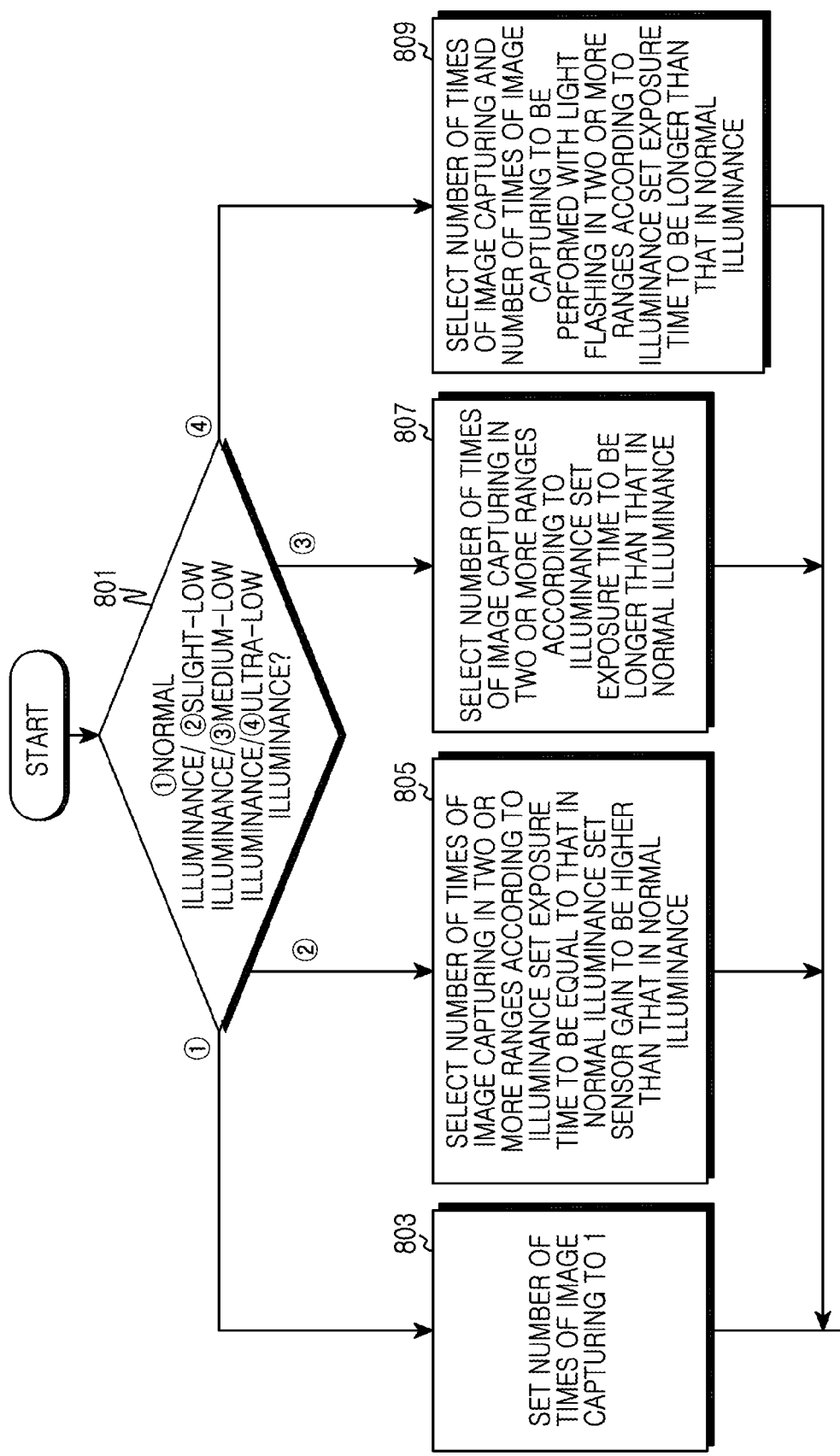
FIG. 8 is a diagram illustrating an operation procedure of an electronic device according to an embodiment of the present disclosure.

FIG. 8 is a diagram illustrating an operation procedure of an electronic device according to an embodiment of the present disclosure.

Referring to FIG. 8, in operation 801, the electronic device may measure illuminance and may determine to which section the illuminance belongs among the normal illuminance, the slight-low illuminance, the medium-low illuminance, and the ultra-low illuminance. The normal illuminance refers to illuminance capable of acquiring an image of predetermined brightness without image synthesis. The slight-low illuminance, the medium-low illuminance, and the ultra-low illuminance are sections that have lower brightness than the normal illuminance, and the environment becomes darker in the order of the slight-low illuminance, the medium-low illuminance, and the ultra-low illuminance. That is, the electronic device may determine to which section the measured illuminance belongs by comparing the threshold values distinguishing the illuminance sections with the measured illuminance.

When the measured illuminance belongs to the normal illuminance, that is, when the measured illuminance is equal to or greater than a first threshold value, the electronic device may proceed to operation 803 to set the number of times of image capturing to, for example, 1. Therefore, for example, one-time image capturing may be performed by a one-time image capturing command. At this time, the exposure time and the sensor sensitivity may be set to be equal to those in the exposure chart of the related art.

When the measured illuminance belongs to the slight-low illuminance, that is, when the measured illuminance is less than the first threshold value and equal to or greater than a second threshold value, the electronic device may proceed to operation 805 to set the number of times of image capturing to multiple, set the exposure time to be equal to that in the normal illuminance, and set the sensor sensitivity to be higher than that in the normal illuminance. At this time, the electronic device may select two or more times of image capturing according to the illuminance. That is, the number of times of image capturing may be different according to the illuminance. For example, as the illuminance is lowered, the number of times of image capturing may be increased stepwise. As another example, as the illuminance is lowered, the number of times of image capturing may be linearly or exponentially increased. Therefore, for example, a plurality of image capturing may be performed by the one-time image capturing command.

When the measured illuminance belongs to the medium-low illuminance, that is, when the measured illuminance is less than the second threshold value and equal to or greater than a third threshold value, the electronic device may proceed to operation 807 to set the number of times of image capturing to multiple and set the exposure time to be longer than that in the normal illuminance. At this time, the electronic device may select a different number of times of image capturing according to the illuminance. For example, as the illuminance is lowered, the number of times of image capturing may be increased stepwise. As another example, as the illuminance is lowered, the number of times of image capturing may be linearly or exponentially increased. Therefore, for example, a plurality of image capturing may be performed by the one-time image capturing command. According to another embodiment of the present disclosure, the electronic device may set the sensor sensitivity to be higher than that in the normal illuminance.

When the measured illuminance belongs to the ultra-low illuminance, that is, when the measured illuminance is less than the third threshold value, the electronic device may proceed to operation 809 to set the number of times of image capturing to multiple, set the exposure time to be longer than that in the normal illuminance, and select the number of times of image captures to be performed with the light flashing. The exposure time may be equal to that in the case of the medium-low illuminance. At this time, the electronic device may differently select the number of times of image capturing according to the illuminance. For example, as the illuminance is lowered, the number of times of image capturing may be increased stepwise. As another example, as the illuminance is lowered, the number of times of image capturing may be linearly or exponentially increased. Therefore, for example, a plurality of image capturing may be performed by the one-time image capturing command. In addition, the number of times of image captures to be performed with the light flashing may be differently selected according to the illuminance. For example, as the illuminance is lowered, the number of times of image capturing to be performed with the light flashing may be increased stepwise. As another example, as the illuminance is lowered, the number of times of image capturing may be linearly or exponentially increased.

The method described above in relation with FIG. 8 under of the present invention may be provided as one or more instructions in one or more software modules, or computer programs stored in an electronic device including a portable terminal.

Figure 9:
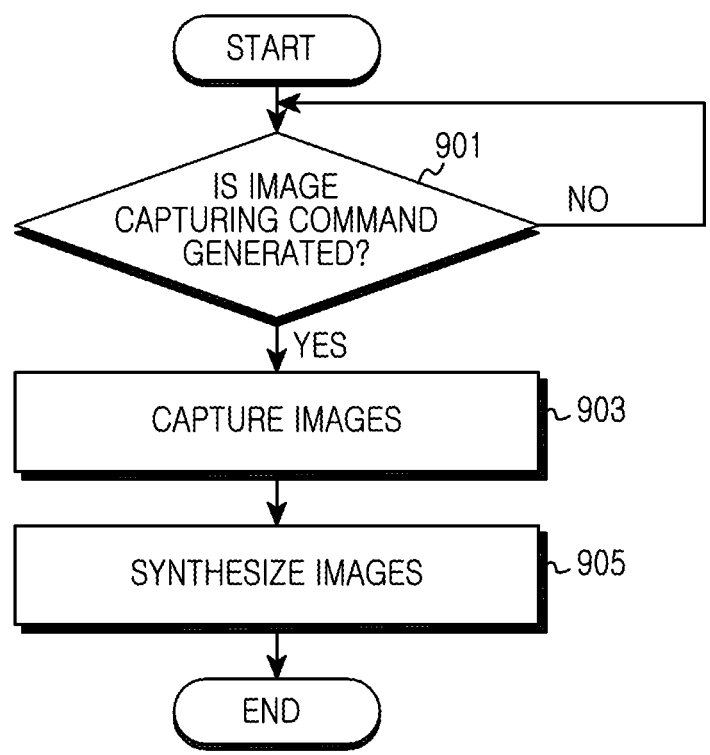
FIG. 9 is a diagram illustrating an operation procedure of an electronic device according to an embodiment of the present disclosure.

FIG. 9 is a diagram illustrating an operation procedure of an electronic device according to an embodiment of the present disclosure. The embodiment illustrated in FIG. 9 is an operation procedure of an electronic device under a slight-low illuminance environment.

Referring to FIG. 9, in operation 901, the electronic device may determine whether an image capturing command is generated. The image capturing command may be generated by a user's manipulation or an occurrence of a predefined event. For example, when a shutter is clicked by the user after the image capturing application is executed, the electronic device may determine that the image capturing command is generated.

When the image capturing command is generated, the electronic device may capture a plurality of images in operation 903. In other words, the electronic device may repetitively perform a plurality of image capturing according to the one-time image capturing command. The number of times of image capturing may be different according to the illuminance. For example, as the illuminance is lowered, the electronic device may increase the number of times of image capturing. In addition, the exposure time may be set to be equal to that that in the normal illuminance, and the sensor sensitivity may be set to be higher than that in the normal illuminance.

The electronic device may proceed to operation 905 to synthesize the plurality of captured images. For the purpose of the image synthesis, the electronic device may select the reference image from the plurality of images, arrange at least one remaining image with reference to the reference image, and correct the pixel values of the reference image by using the pixel values of the images. At this time, when the local motion is present in the plurality of images, the electronic device may extract the local motion part and separately synthesize the local motion part and the other parts. That is, the electronic device may generate one resulting image by synthesizing the plurality of images.

The method described above in relation with FIG. 9 under of the present invention may be provided as one or more instructions in one or more software modules, or computer programs stored in an electronic device including a portable terminal.

Figure 10:
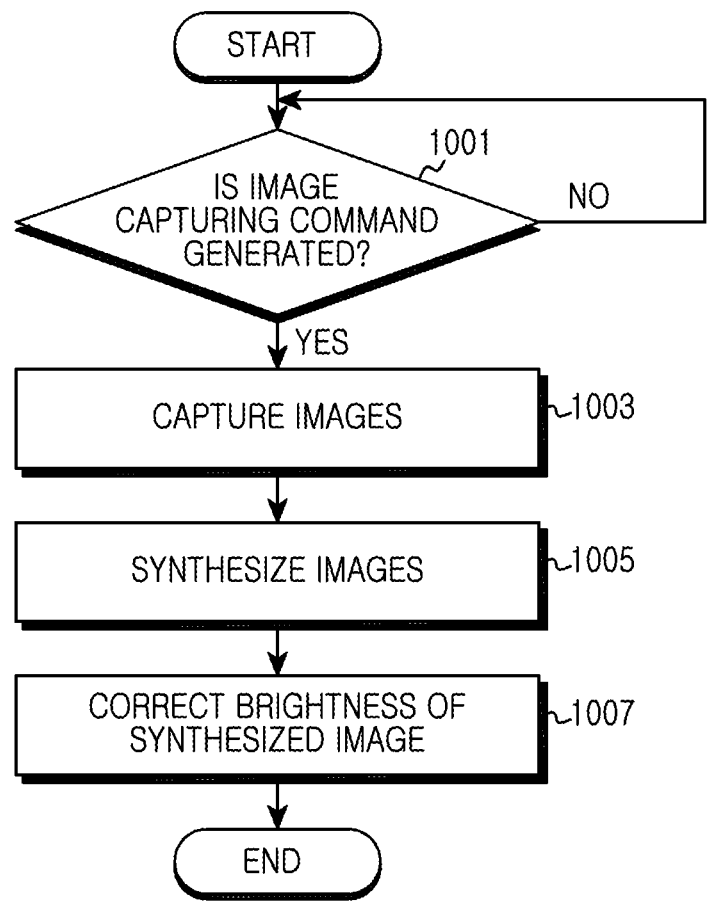
FIG. 10 is a diagram illustrating an operation procedure of an electronic device according to an embodiment of the present disclosure.

FIG. 10 is a diagram illustrating an operation procedure of an electronic device according to an embodiment of the present disclosure. The embodiment illustrated in FIG. 10 is an operation procedure of an electronic device under a medium-low illuminance environment.

Referring to FIG. 10, in operation 1001, the electronic device may determine whether an image capturing command is generated. The image capturing command may be generated by a user's manipulation or an occurrence of a predefined event. For example, when a shutter is clicked by the user after the image capturing application is executed, the electronic device may determine that the image capturing command is generated.

When the image capturing command is generated, the electronic device may capture a plurality of images in operation 1003. In other words, the electronic device may repetitively perform a plurality of image capturing according to the one-time image capturing command. The number of times of image capturing may be different according to the illuminance. For example, as the illuminance is lowered, the electronic device may increase the number of times of image capturing. In addition, the exposure time may be set to be longer than that in the case of the normal illuminance.

The electronic device may proceed to operation 1005 to synthesize the plurality of captured images. For the purpose of the image synthesis, the electronic device may select the reference image from the plurality of images, arrange at least one remaining image with reference to the reference image, and correct the pixel values of the reference image by using the pixel values of the images. At this time, when the local motion is present in the plurality of images, the electronic device may extract the local motion part and separately synthesize the local motion part and the other parts.

After synthesizing the plurality of images, the electronic device may proceed to operation 1007 to correct the brightness of the synthesized image. As the brightness correction method, tone mapping, histogram equalization, or a retinex technique may be used. By using these methods together, it is possible to generate a resulting image in which color information recovery and contrast are improved under the low illuminance environment.

The method described above in relation with FIG. 10 under of the present invention may be provided as one or more instructions in one or more software modules, or computer programs stored in an electronic device including a portable terminal.

Figure 11:
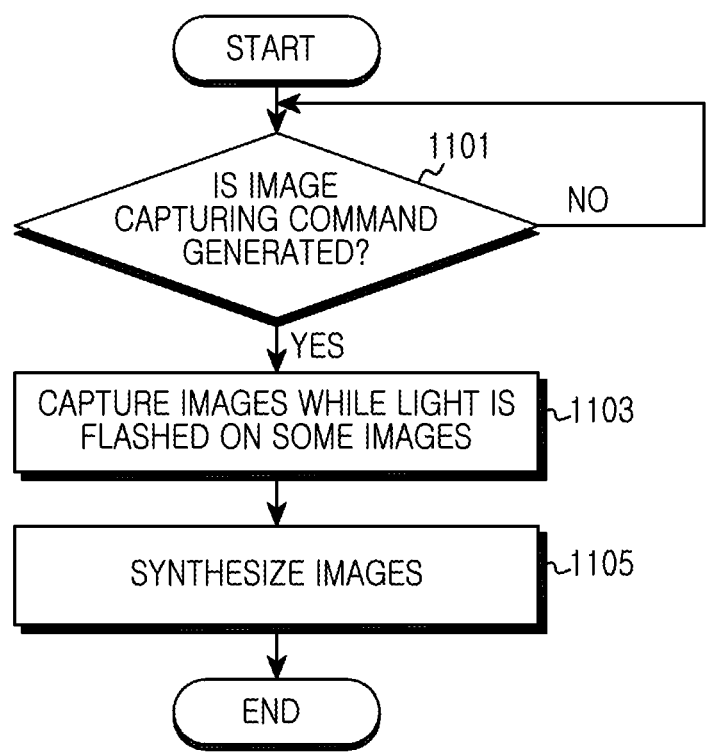
FIG. 11 is a diagram illustrating an operation procedure of an electronic device according to an embodiment of the present disclosure.

FIG. 11 is a diagram illustrating an operation procedure of an electronic device according to an embodiment of the present disclosure. The embodiment illustrated in FIG. 11 is an operation procedure of an electronic device under an ultra-low illuminance environment.

Referring to FIG. 11, in operation 1101, the electronic device may determine whether an image capturing command is generated. The image capturing command may be generated by a user's manipulation or an occurrence of a predefined event. For example, when a shutter is clicked by the user after the image capturing application is executed, the electronic device may determine that the image capturing command is generated.

When the image capturing command is generated, the electronic device captures a plurality of images in operation 1103, and light flashing may be accompanied with respect to a part of the images. In other words, the electronic device may repetitively perform a plurality of image capturing according to the one-time image capturing command. The number of times of image capturing and the number of times of image capturing with the light flashing may be different according to the illuminance. For example, as the illuminance is lowered, the electronic device may decrease the number of times of image capturing and increase the number of times of image capturing with the light flashing. In addition, the exposure time may be set to be longer than that in the case of the normal illuminance.

The electronic device may proceed to operation 1105 to synthesize the plurality of captured images. For the purpose of the image synthesis, the electronic device may select the reference image from the plurality of images, arrange at least one remaining image with reference to the reference image, separate the subject and the background based on a brightness difference between the image captured with the light flashing and the image captured without light flashing, and synthesize the subject part and the background part with different weight values. At this time, when the local motion is present in the plurality of images, the electronic device may extract the local motion part and separately synthesize the local motion part and the other parts. That is, the electronic device may generate one resulting image by synthesizing the plurality of images.

According to another embodiment of the present disclosure, the electronic device may correct the brightness of the synthesized image under the ultra-low illuminance environment. As an example of the brightness correction method, tone mapping, histogram equalization, or a retinex technique may be used. By using these methods together, it is possible to generate a resulting image in which color information recovery and contrast are improved under the low illuminance environment.

The method described above in relation with FIG. 11 under of the present invention may be provided as one or more instructions in one or more software modules, or computer programs stored in an electronic device including a portable terminal.

Figure 12:
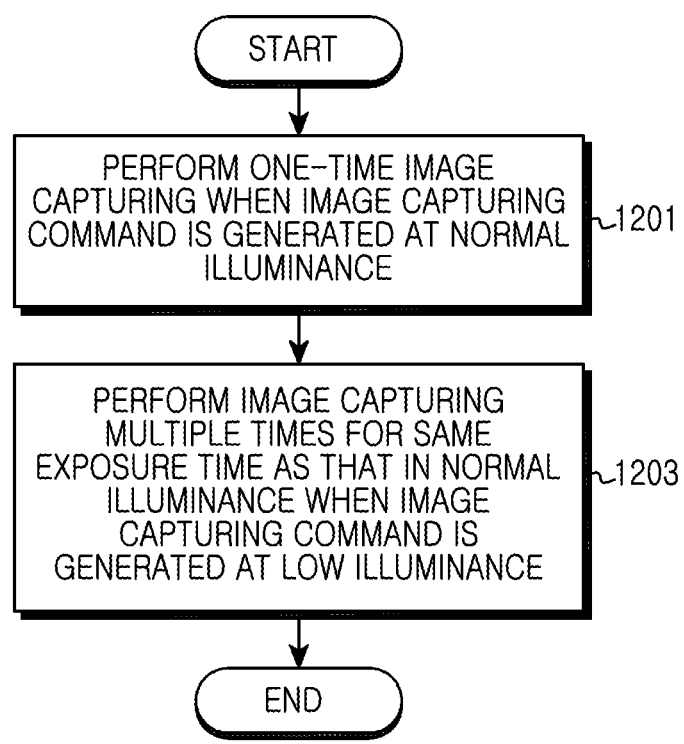
FIG. 12 is a diagram illustrating an operation procedure of an electronic device according to an embodiment of the present disclosure.

FIG. 12 is a diagram illustrating an operation procedure of an electronic device according to an embodiment of the present disclosure.

Referring to FIG. 12, in operation 1201, the electronic device may perform one-time image capturing when an image capturing command is generated under the normal illuminance environment. The normal illuminance refers to illuminance capable of acquiring an image of predetermined brightness, without image synthesis according to an embodiment of the present disclosure. Therefore, the electronic device may perform only one-time image capturing.

The electronic device may proceed to operation 1203 to capture a plurality of images for the same exposure time as that in the case of the normal illuminance when the image capturing command is generated under the low illuminance environment. That is, the electronic device prevents the camera shake by maintaining the exposure time, and increases the sensor sensitivity as compared with the case of the normal illuminance so as to ensure the predefined brightness. In addition, the electronic device may synthesize the plurality of images so as to reduce noise associated with the increase of the sensor sensitivity. In addition, as the illuminance is lowered, the number of times of image capturing may be increased.

The method described above in relation with FIG. 12 under of the present invention may be provided as one or more instructions in one or more software modules, or computer programs stored in an electronic device including a portable terminal.

Figure 13:
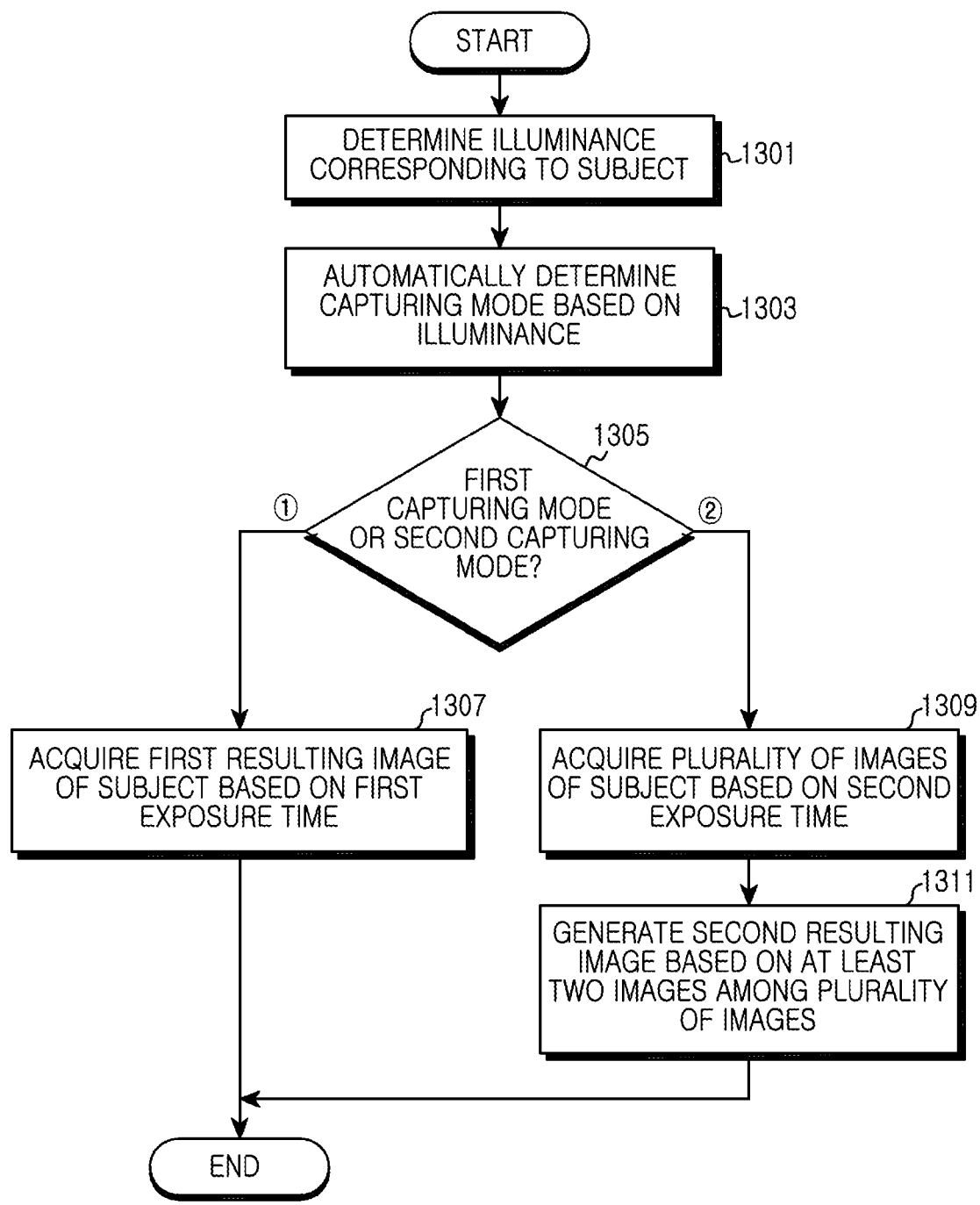
FIG. 13 is a diagram illustrating an operation procedure of an electronic device according to an embodiment of the present disclosure.

FIG. 13 is a diagram illustrating an operation procedure of an electronic device according to an embodiment of the present disclosure.

Referring to FIG. 13, in operation 1301, the electronic device may determine the illuminance corresponding to the subject. For example, the electronic device may determine the exposure value based on the illuminance.

The electronic device may proceed to operation 1303 to automatically determine a capturing mode of the electronic device based on at least the illuminance.

After automatically determining the capturing mode, the electronic device may proceed to operation 1305 to check the determined capturing mode. The electronic device may proceed to operation 1307 when the capturing mode is a first capturing mode, and proceed to operation 1309 when the capturing mode is a second capturing mode.

When the capturing mode is the first capturing mode, the electronic device may proceed to operation 1307 to acquire a first resulting image of the subject based on the first exposure time. In this case, the electronic device may apply a first sensor gain so as to acquire the first resulting image.

When the capturing mode is the second capturing mode, the electronic device may proceed to operation 1309 to acquire a plurality of images of the subject based on the second exposure time. The second exposure time may be less than the first exposure time. In this case, the electronic device may apply a second sensor gain different from the first sensor gain. In other words, the first sensor gain may be applied when the illuminance is in a first range, and the second sensor gain higher than the first sensor gain may be applied when the illuminance is in a second range lower than the first range. According to an embodiment of the present disclosure, the electronic device may increase the number of the images as the illuminance is lowered, or may decrease the number of the images as the illuminance is increased.

The electronic device may proceed to operation 1311 to generate the second resulting image based on at least two images among the plurality of images. For example, the electronic device may synthesize the at least two images. For example, the electronic device may select the least blurred image of the at least two images as the reference image, arrange at least one remaining image with reference to the reference image, and correct the pixel values of the reference image based on the pixel values of the at least one remaining image.

According to another embodiment of the present disclosure, the electronic device may determine a region corresponding to the local motion associated with at least a part of the subject in each of the at least two images, determine the other regions in each of the at least two images, synthesize the regions determined in each of the at least two images, and synthesize the other regions determined in each of the at least two images. At this time, the electronic device may arrange at least a part of the regions based on a direction of the local motion. In the synthesis of the other regions, the electronic device may arrange at least a part of the other regions based on a direction of motion of at least another part of the subject.

According to another embodiment of the present disclosure, when the illuminance is less than a set threshold value, the electronic device may enhance the brightness of all or part of the at least two images or the brightness of the second resulting image.

According to another embodiment of the present disclosure, when the illuminance is less than a set threshold value, the electronic device may flash light upon acquisition of at least a part of the images. The threshold value at which the brightness enhancement is performed may be equal to or different from the threshold value at which the light flashing is performed. The at least two images include at least one image acquired by flashing light. At this time, in order to generate the second resulting image, the electronic device may separate a main subject or a sub subject of the subject, based on a brightness difference between the images acquired by flashing light and the other images among the at least two images, synthesize a region corresponding to the main subject of the at least two images by applying the first weight value, and synthesize a region corresponding to the sub subject of the at least two images by applying the second weight value. In this case, as the illuminance is lowered, the electronic device may increase the number of the images acquired by flashing light, or as the illuminance is increased, the electronic device may decrease the number of the images acquired by flashing light.

The method described above in relation with FIG. 13 under of the present invention may be provided as one or more instructions in one or more software modules, or computer programs stored in an electronic device including a portable terminal.

Figure 14:
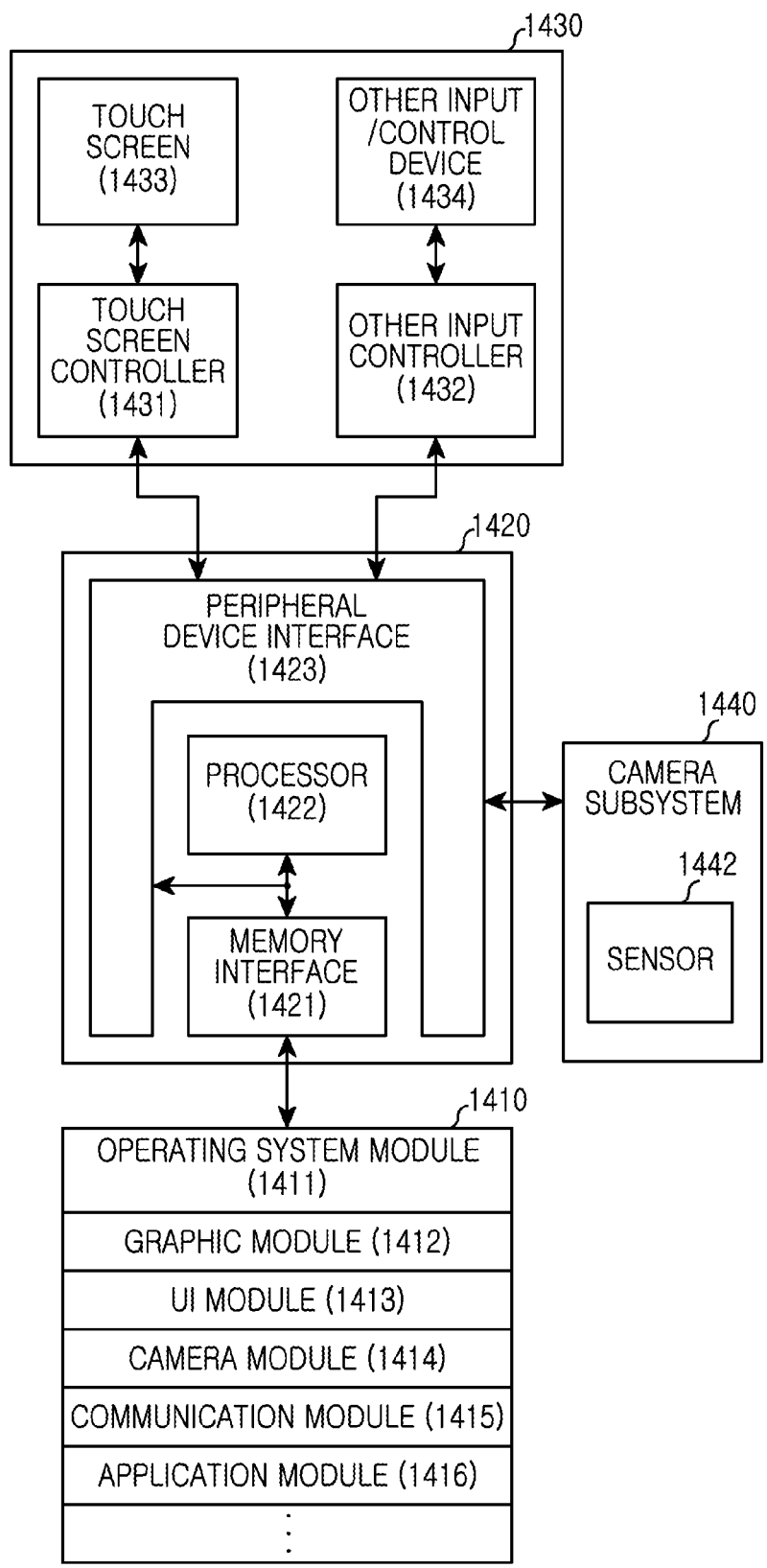
FIG. 14 is a block diagram of an electronic device according to an embodiment of the present disclosure.

FIG. 14 is a block diagram of an electronic device according to an embodiment of the present disclosure. The present invention may be implemented in an electronic device including a portable terminal such as, for example, a smart phone and a mobile telecommunication terminal.

Referring to FIG. 14, the electronic device may include a memory 1410, a processor unit 1420, an input/output subsystem 1430, and a camera subsystem 1440. A plurality of memories 1410 may be provided.

The memory 1410 may store at least one software, microcodes, and setting information. The memory 1410 may include at least one of a high-speed random access memory, a nonvolatile memory, an optical storage device, and a flash memory (for example, NAND flash memory or NOR flash memory). Software elements stored in the memory 1410 may include an operating system module 1411, a graphic module 1412, a User Interface (UI) module 1413, a camera module 1414, a communication module 1415, and at least one application module 1416. In addition, the modules being software elements may be represented by a set of instructions, and the modules may also be referred to as an "instruction set" or a "program".

The operating system module 1411 may include an instruction set that controls a general system operation. For example, the operating system module 1411 may be an embedded operating system, such as WINDOWS, LINUX, DAWIN, RTXC, UNIX, OS X, VxWorks, Android, and iOS. For example, the operating system module 1411 may manage a general operation control, such as memory management and control, storage hardware management and control, and power control and management. The operating system module 1411 may perform control for smooth communication between at least one hardware element and at least one software element.

The graphic module 1412 may include at least one instruction set for providing and displaying graphics on a touch screen 1433. The graphics may include a text, a web page, an icon, a digital image, a video, and an animation. Since the touch screen 1433 displays an image, the touch screen 1433 may be referred to as a "display unit".

The user interface module 1413 may include at least one instruction set for providing a user interface. For example, the user interface module 1413 may control how the state of the user interface is changed, or under what condition the state of the user interface is changed.

The camera module 1414 may include at least one instruction set for executing camera-related processes or functions. For example, the camera module 1414 may include a command set for operating the camera subsystem 1440 so as to capture a still image, a moving image, and the like.

The communication module 1415 may include at least one instruction set for providing communication. For example, the communication module 1415 may control interaction with a cellular network, Bluetooth communication, Wi-Fi communication, Near Field Communication, and the like.

The at least one application module 1416 may include at least one instruction set for providing an application. Such application may be any of a plurality of different applications supporting a function of the electronic device.

According to an embodiment of the present disclosure, as illustrated in FIG. 2, the memory 1410 may store information on the exposure chart and the illuminance section according to an embodiment of the present disclosure. For example, the information on the exposure chart and the illuminance section may include threshold values distinguishing the illuminance sections, the exposure time at each illuminance section, and the sensor sensitivity values.

The memory 1410 may include additional modules other than the above-described modules 1411 to 1416. In addition, according to another embodiment of the present disclosure, a part of the above-described modules 1411 to 1416 may be excluded.

The processor unit 1420 may include a memory interface 1421, a processor 1422, and a peripheral device interface 1423. In some cases, the entire processor unit 1420 may be referred to as a "processor". The memory interface 1421, the processor 1422, and the peripheral device interface 1423 may be separate elements or may be embedded in at least one integrated circuit.

The processor 1422 may include at least one hardware chip. The processor 1422 may execute the software module to allow the electronic device to perform the function implemented by the software module In particular, the processor 1422 may carry out an embodiment of the present disclosure while interworking with the software module stored in the memory 1410. In addition, the processor 1422 may include at least one data processor and image processor. According to another embodiment of the present disclosure, the data processor and the image processor may constitute separate hardware. In addition, the processor 1422 may include a plurality of processors executing different functions. The processor 1422 may be referred to as AP.

The memory interface 1421 may provide a transfer path of data and control signals between the memory 1410 and the processor 1422. For example, the memory interface 1421 may provide an interface for access to the memory 1410. The peripheral device interface 1423 may connect the input/output subsystem 1430 of the electronic device and at least one peripheral device to the processor 1422 and the memory 1410.

The input/output subsystem 1430 may include a touch screen controller 1431, another input controller 1432, a touch screen 1433, and another input/control device 1434.

The touch screen controller 1431 may be connected to the touch screen 1433. The touch screen 1433 and the touch screen controller 1431 may detect a touch, a motion, and a stop of the touch or the motion by using, but not limited to, detection techniques including a proximity sensor array other elements, as well as capacitive, resistive, infrared light, and surface acoustic wave techniques for determining at least one touch point on the touch screen 1433.

The other input controller 1432 may be connected to the other input/control device 1434. The other input/control device 1434 may include at least one up/down button for controlling a volume. In addition, the button may have a form of a push button, a locker button, a locker switch, a thumb-wheel, a dial, a stick, or a pointer device such as a stylus.

The touch screen 1433 may provide an input/output interface between the electronic device and the user. For example, the touch screen 1433 may transfer a user's touch input to the electronic device. In addition, the touch screen 1433 is a medium that shows a user an output from the electronic device. For example, the touch screen 1433 shows a user a visual output. The visual output may be represented in a form of a text, a graphic, a video, and a combination thereof. Various display units may be used for the touch screen 1433. For example, the touch screen 1433 may include, but is not limited to, at least one of an LCD, an LED, an LPD, an OLED, an AMOLED, and an FLED.

The camera subsystem 1440 may perform the functions of taking a picture and shooting a moving picture. The camera subsystem 1440 may include at least one of a sensor 1442 (e.g., an image sensor), a lens, a flash, and an image processor (for example, an image signal processor). As the image sensor, at least one of a CCD and a CMOS may be used. For example, the camera subsystem 1440 may recognize light incident through the lens by using the image sensor and convert an image recognized in the image sensor into data.

According to an embodiment of the present disclosure, the processor 1422 may perform different image processing according to the illuminance so as to acquire an image without camera shake. For this purpose, the processor 1422 may include an illuminance analysis module for analyzing the illuminance of the subject and the background, an image analysis module for analyzing the mismatch and brightness difference between the captured images, and an image synthesis module for synthesizing the images. According to another embodiment of the present disclosure, the memory 1410 may store software modules including instruction sets for the image processing operations of the illuminance analysis module, the image analysis module, and the image synthesis module, and the processor 1422 may execute the software modules. That is, the processor 1422 may execute the procedures of FIGS. 7 to 12. According to another embodiment of the present disclosure, separate hardware blocks for performing the image processing operations may be provided. According to another embodiment of the present disclosure, the functions of performing the image processing operations may be implemented in the processor 1422 and separate processors in a distributed manner.

According to an embodiment of the present disclosure, the processor 1422 may determine the illuminance corresponding to the subject, automatically determine the capturing mode based on at least the illuminance, acquire the first resulting image of the subject based on the first exposure time, when the capturing mode is the first capturing mode, acquire a plurality of images of the subject based on the second exposure time, when the capturing mode is the second capturing mode, and generate the second resulting image based on at least two images of the plurality of images.

According to another embodiment of the present disclosure, the processor 1422 may measure the illuminance of the image to be captured, and control the image capturing setting according to the section to which the measured illuminance belongs. Specifically, the processor 1422 may determine to which section the measured illuminance belongs among the normal illuminance, the slight-low illuminance, the medium-low illuminance, and the ultra-low illuminance. When the measured illuminance belongs to the normal illuminance, the processor 1422 may set the number of times of image capturing to, for example, 1. When the measured illuminance belongs to the slight-low illuminance, the processor 1422 may set the number of times of image capturing to multiple, set the exposure time to be equal to that in the normal illuminance, and set the sensor sensitivity to be higher than that in the normal illuminance. In this case, as the illuminance is lowered, the number of times of image capturing may be increased stepwise. As another example, as the illuminance is lowered, the number of times of image capturing may be linearly or exponentially increased. When the measured illuminance belongs to the medium-low illuminance, the processor 1422 may set the number of times of image capturing to multiple and set the exposure time to be longer than that in the normal illuminance. In this case, as the illuminance is lowered, the number of times of image capturing may be increased stepwise. As another example, as the illuminance is lowered, the number of times of image capturing may be linearly or exponentially increased.

According to another embodiment of the present disclosure, the processor 1422 may set the sensor sensitivity to be higher than that in the normal illuminance. When the measured illuminance belongs to the ultra-low illuminance, the processor 1422 may set the number of times of image capturing to multiple, set the exposure time to be longer than that in the normal illuminance, and select the number of times of image capturing to be performed with the light flashing. The exposure time may be equal to that in the case of the medium-low illuminance. In this case, as the illuminance is lowered, the number of times of image capturing may be linearly or exponentially increased. In addition, as the illuminance is lowered, the number of times of image capturing to be performed with the light flashing may be increased stepwise. As another example, as the illuminance is lowered, the number of times of image capturing may be linearly or exponentially increased. As described above, when the illuminance is not the normal illuminance, a plurality of image capturing may be performed by the one-time image capturing command.

According to another embodiment of the present disclosure, in the case of the slight-low illuminance environment, when the image capturing command is generated, the processor 1422 may capture a plurality of images and synthesize the plurality of captured images. For the purpose of the image synthesis, the processor 1422 may select the reference image from the plurality of images, arrange at least one remaining image with reference to the reference image, and correct the pixel values of the reference image by using the pixel values of the images.

According to another embodiment of the present disclosure, in the case of the medium-low illuminance environment, when the image capturing command is generated, the processor 1422 may capture a plurality of images, synthesize the plurality of captured images, and correct the brightness of the synthesized image. For example, the processor 1422 may correct the brightness of the synthesized image in which color information and contrast are improved using the image improvement algorithm, such as tone mapping, histogram equalization, or a retinex technique.

According to another embodiment of the present disclosure, in the case of the ultra-low illuminance environment, when the image capturing command is generated, the processor 1422 may capture a plurality of images, while flashing light to some images. Then, the processor 1422 may synthesize the plurality of captured images. At this time, the processor 1422 may separate the subject and the background, based on the brightness difference between the image captured with the light flashing and the image captured without the light flashing, and may synthesize the subject part and the background part with different weight values. Furthermore, the processor 1422 may correct the brightness of the synthesized image.

In the above-described image synthesis procedure, when the local motion is present in the plurality of images, the processor 1422 may extract the local motion part and separately synthesize the local motion part and the other parts.

According to another embodiment of the present disclosure, the processor 1422 may perform one-time image capturing when an image capturing command is generated under the normal illuminance environment. On the other hand, when an image capturing command is generated under the low illuminance environment, the processor 1422 may capture an image for the same exposure time as that in the case of the normal illuminance. That is, the processor 1422 prevents the camera shake by maintaining the exposure time, and increases the sensor sensitivity as compared with the case of the normal illuminance so as to ensure a predefined brightness. In addition, the processor 1422 may synthesize a plurality of images so as to reduce noise increasing with the increase of the sensor sensitivity.

The various functions of the electronic device according to embodiments of the present disclosure may be executed by at least one of stream processing, hardware including an application-specific integrated circuit, software, or a combination thereof.

In the various embodiments of the present disclosure as described above, the elements included in the present disclosure have been expressed in singular or plural form according to the suggested specific embodiments. However, the expression in the singular or plural form are appropriately selected according to the suggested situations for convenience of explanation, and are not intended to limit the present disclosure to the single or plural elements. Even though a certain element is expressed in a plural form, it may be provided with a single element, and even though a certain element is expressed in a singular form, it may be provided with a plurality of elements.

The electronic device may acquire an image without camera shake by synthesizing a plurality of images under a low illuminance environment. Furthermore, low illuminance environments are divided into a plurality of sections according to the illuminance, and differentiated image processing is provided to each section, resulting in more efficient image processing.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for an operation of an electronic device, the method comprising:
   determining illuminance corresponding to a subject;
   automatically determining a capturing mode of an electronic device based on at least the illuminance;
   acquiring a first resulting image of the subject based on a first exposure time, if the capturing mode is a first capturing mode; and
   acquiring a plurality of images of the subject based on a second exposure time, if the capturing mode is a second capturing mode, and generating a second resulting image based on at least two images among the plurality of images,
   wherein the generating of the second resulting image based on the at least two images comprises synthesizing the at least two images, and
   wherein the synthesizing of the at least two images comprises:
      selecting a least blurred image as a reference image among the at least two images,
      arranging at least one remaining image with reference to the reference image, and
      correcting pixel values of the reference image based on pixel values of the at least one remaining image.

2. The method of claim 1, wherein the second exposure time is shorter than the first exposure time.

3. The method of claim 1, wherein the determining of the illuminance comprises determining an exposure value based on the illuminance.

4. The method of claim 1, wherein the acquiring of the first resulting image comprises applying a first sensor gain.

5. The method of claim 4, wherein the acquiring of the plurality of images of the subject based on the second exposure time comprises applying a second sensor gain different from the first sensor gain.

6. The method of claim 1, wherein the acquiring of the plurality of images of the subject based on the second exposure time comprises one of increasing a number of the plurality of images as the illuminance is lowered, and decreasing the number of the plurality of images as the illuminance is increased.

7. The method of claim 1, wherein the acquiring of the plurality of images of the subject based on the second exposure time comprises:
   applying a first sensor gain if the illuminance is in a first range; and
   applying a second sensor gain higher than the first sensor gain if the illuminance is in a second range lower than the first range.

8. The method of claim 1, wherein the synthesizing of the at least two images comprises:
   determining regions corresponding to a local motion associated with at least a part of the subject in each of the at least two images;
   determining regions other than the regions in each of the at least two images;
   synthesizing the regions determined in each of the at least two images; and
   synthesizing the other regions determined in each of the at least two images.

9. The method of claim 8, wherein the synthesizing of the regions comprises arranging at least a part of the regions based on a direction of the local motion.

10. The method of claim 8, wherein the synthesizing of the other regions comprises arranging at least a part of the other regions based on a direction of motion of at least another part of the subject included in the other regions.

11. The method of claim 1, wherein, if the illuminance is less than a set threshold value, the synthesizing of the at least two images comprises enhancing brightness of all or part of the at least two images or brightness of the second resulting image.

12. The method of claim 1, wherein, if the illuminance is less than a set threshold value, the acquiring of the plurality of images comprises flashing light upon acquisition of at least a part of the plurality of images.

13. The method of claim 1,
   wherein the at least two images comprise at least one image acquired with light flashing, and
   wherein the generating of the second resulting image comprises:
      separating the subject into a main subject and a sub subject based on a brightness difference between images acquired with the light flashing and the other images among the at least two images;
      synthesizing regions corresponding to the main subject of the at least two images by applying a first weight value, and
      synthesizing regions corresponding to the sub subject of the at least two images by applying a second weight value.

14. The method of claim 1,
   wherein the at least two images comprise at least one image acquired with light flashing, and
   wherein the generating of the second resulting image comprises increasing a number of the images acquired with light flashing as the illuminance is lowered, or decreasing the number of the images acquired with light flashing as the illuminance is increased.

15. An electronic device comprising:
   an image sensor configured to acquire an image of a subject; and
   at least one processor configured to:
      determine illuminance corresponding to the subject,
      automatically determine a capturing mode based on at least the illuminance,
      acquire a first resulting image of the subject based on a first exposure time, if the capturing mode is a first capturing mode,
      acquire a plurality of images of the subject based on a second exposure time, if the capturing mode is a second capturing mode, and
      generate a second resulting image of the subject based on at least two images among the plurality of images,
   wherein the generating of the second resulting image based on the at least two images comprises synthesizing the at least two images, and
   wherein the synthesizing of the at least two images comprises:
      selecting a least blurred image as a reference image among the at least two images,
      arranging at least one remaining image with reference to the reference image, and
      correcting pixel values of the reference image based on pixel values of the at least one remaining image.

16. The electronic device of claim 15, wherein the second exposure time is shorter than the first exposure time.

17. The electronic device of claim 15, wherein the at least one processor is further configured to determine an exposure value based on the illuminance.

18. The electronic device of claim 15, wherein the at least one processor is further configured to:

acquire the first resulting image by applying a first sensor gain, and acquire the plurality of images by applying a second sensor gain different from the first sensor gain.

19. The electronic device of claim 15, wherein, if the illuminance is less than a set threshold value, the at least one processor is further configured to perform image synthesis by enhancing brightness of all or part of the at least two images or brightness of the second resulting image.

20. The electronic device of claim 15, wherein, if the illuminance is less than a set threshold value, the at least one processor is further configured to flash light upon acquisition of at least a part of the plurality of images.

21. The electronic device of claim 15,
wherein the at least two images comprise at least one image acquired with light flashing, and
wherein the at least one processor is further configured to:
separate the subject into a main subject and a sub subject, based on a brightness difference between images acquired with the light flashing and the other images among the at least two images,
synthesize regions corresponding to the main subject of the at least two images by applying a first weight value, and
synthesize regions corresponding to the sub subject of the at least two images by applying a second weight value.

22. At least one non-transitory computer-readable recording medium storing instructions for executing a process comprising:
determining illuminance corresponding to a subject;
automatically determining a capturing mode of an electronic device, based on at least the illuminance;
acquiring a first resulting image of the subject based on a first exposure time, if the capturing mode is a first capturing mode; and
acquiring a plurality of images of the subject based on a second exposure time, if the capturing mode is a second capturing mode, and generating a second resulting image of the subject based on at least two images among the plurality of images;
wherein the generating of the second resulting image based on the at least two images comprises synthesizing the at least two images, and
wherein the synthesizing of the at least two images comprises:
selecting a least blurred image as a reference image among the at least two images,
arranging at least one remaining image with reference to the reference image, and
correcting pixel values of the reference image based on pixel values of the at least one remaining image.

* * * * *